US012611807B2

(12) United States Patent
Tsutsumi et al.

(10) Patent No.: US 12,611,807 B2
(45) Date of Patent: Apr. 28, 2026

(54) CONTROL DEVICE OF INJECTION MOLDING MACHINE, INJECTION MOLDING MACHINE, AND METHOD OF CONTROLLING INJECTION MOLDING MACHINE

(71) Applicant: SUMITOMO HEAVY INDUSTRIES, LTD., Tokyo (JP)

(72) Inventors: Yutaka Tsutsumi, Chiba (JP); Daigo Hotta, Chiba (JP); Shun Shibuya, Chiba (JP); Yuki Matsui, Chiba (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 432 days.

(21) Appl. No.: 18/057,209

(22) Filed: Nov. 19, 2022

(65) Prior Publication Data

US 2023/0311388 A1    Oct. 5, 2023

(30) Foreign Application Priority Data

Mar. 31, 2022    (JP) ................................. 2022-060927

(51) Int. Cl.
*B29C 45/76* (2006.01)
*B29C 37/00* (2006.01)
*B29C 45/00* (2006.01)

(52) U.S. Cl.
CPC .... *B29C 45/7653* (2013.01); *B29C 2037/906* (2013.01); *B29C 45/0025* (2013.01); *B29C 2945/76505* (2013.01); *B29C 2945/76869* (2013.01)

(58) Field of Classification Search
None
See application file for complete search history.

(56) References Cited

U.S. PATENT DOCUMENTS

| | | | |
|---|---|---|---|
| 5,540,577 A | 7/1996 | Ishikawa et al. |
| 5,756,019 A | 5/1998 | Nakazawa et al. |
| 2004/0013766 A1 | 1/2004 | Yoshioka |

(Continued)

FOREIGN PATENT DOCUMENTS

| | | | |
|---|---|---|---|
| CN | 1468701 A | 1/2004 |
| DE | 694 22 681 T2 | 11/2000 |

(Continued)

OTHER PUBLICATIONS

Uchiyama JP2010137542A English Translation 2010 (Year: 2010).*

(Continued)

*Primary Examiner* — Jacob T Minskey
*Assistant Examiner* — Adrien J Bernard
(74) *Attorney, Agent, or Firm* — WTA IP Law P.C.

(57) ABSTRACT

A technique for suppressing molding defects is provided. A control device of an injection molding machine includes: a mold clamping control unit that controls, with respect to an actual value of a mold clamping force for pressing a stationary mold and a movable mold after pressurizing of the mold clamping force is completed and before a molding material reaches parting surfaces of the stationary mold and the movable mold, a range of increase in the actual value of the mold clamping force after the molding material reaches the parting surfaces to an upper limit or less.

12 Claims, 8 Drawing Sheets

(56)                References Cited

U.S. PATENT DOCUMENTS

| | | | | |
|---|---|---|---|---|
| 2010/0109182 | A1* | 5/2010 | Kudo | B29C 45/7653 |
| | | | | 264/40.5 |
| 2013/0251836 | A1 | 9/2013 | Tokuno et al. | |
| 2014/0134284 | A1 | 5/2014 | Oono et al. | |
| 2015/0202815 | A1* | 7/2015 | Murata | B29C 45/76 |
| | | | | 264/40.5 |
| 2021/0086424 | A1* | 3/2021 | Hakoda | B29C 45/7613 |
| 2022/0250299 | A1* | 8/2022 | Okamoto | B29C 45/80 |

FOREIGN PATENT DOCUMENTS

| | | | |
|---|---|---|---|
| DE | 10 2012 018 749 A1 | 4/2013 | |
| JP | H4-052062 A | 2/1992 | |
| JP | H08-34 041 A | 2/1996 | |
| JP | 2001-150505 A | 6/2001 | |
| JP | 2008-006651 A | 1/2008 | |
| JP | 2010-111006 A | 5/2010 | |
| JP | 2010137542 A * | 6/2010 | B29C 45/7653 |
| JP | 2012-206499 | 10/2012 | |
| JP | 2013-075382 A | 4/2013 | |
| JP | 2013-199100 A | 10/2013 | |
| JP | 2017-077626 A | 4/2017 | |
| JP | 2021-138079 A | 9/2021 | |

OTHER PUBLICATIONS

Office Action of the corresponding DE 10 2022 134 907.1 mailed on Mar. 27, 2024.
Office Action of JP Application No. 2022-060927 Mailed on Dec. 23, 2025.
Office Action of the corresponding CN Application No. 202211585453.6 Mailed on Jan. 16, 2026.

* cited by examiner

CONTROL DEVICE OF INJECTION MOLDING MACHINE, INJECTION MOLDING MACHINE, AND METHOD OF CONTROLLING INJECTION MOLDING MACHINE

CROSS-REFERENCE TO RELATED APPLICATIONS

The content of Japanese Patent Application No. 2022-060927, filed on Mar. 31, 2022, on the basis of which priority benefits are claimed in an accompanying application data sheet, is in its entirety incorporated herein by reference.

BACKGROUND

Technical Field

Certain embodiments of the present invention relate to a control device of an injection molding machine, an injection molding machine, and a method of controlling an injection molding machine.

Description of Related Art

An injection molding machine includes a mold clamping unit that performs mold clamping of a mold unit including a stationary mold and a movable mold, and an injection unit that fills an inside of the mold unit with a molding material. The mold unit forms a cavity space on parting surfaces between the stationary mold and the movable mold during mold clamping. The injection unit fills the cavity space with the molding material and the molding material cools and solidifies, whereby a molding product is obtained.

In an injection molding machine of the related art, a mold clamping force is generated by closing a mold via a mold clamping mechanism based on a set mold clamping force, and a molten resin is injected into the mold by an injection mechanism. In a method of setting the mold clamping force of the injection molding machine, the mold clamping force is generated by two or more different set mold clamping forces to perform injection, and the mold clamping force during the injection is measured. Then, a relational expression between a maximum value of the measured mold clamping force and the set mold clamping force is obtained, a mold clamping force in which the maximum value of the measured mold clamping force and the set mold clamping force are equal to each other is obtained from the relational expression, and the obtained mold clamping force is set.

Hitherto, a method of setting a mold clamping force has been studied. In a case where the mold clamping force is large, when the molding material reaches the parting surfaces between the stationary mold and the movable mold, the stationary mold and the movable mold are not opened due to a pressure of the molding material, the molding material does not leak, and no burrs occur. However, in a case where the stationary mold and the movable mold are not opened, it is difficult for a gas to escape from the inside of the mold unit to the outside, and the gas is compressed inside the mold unit and generates heat, resulting in gas burning.

SUMMARY

According to an embodiment of the present invention, there is provided a technique for suppressing molding defects.

A control device of an injection molding machine according to an aspect of the present invention includes: a mold clamping control unit that controls, with respect to an actual value of a mold clamping force for pressing a stationary mold and a movable mold after pressurizing of the mold clamping force is completed and before a molding material reaches parting surfaces of the stationary mold and the movable mold, a range of increase in the actual value of the mold clamping force after the molding material reaches the parting surfaces to an upper limit or less.

DETAILED DESCRIPTION

Figure 1:
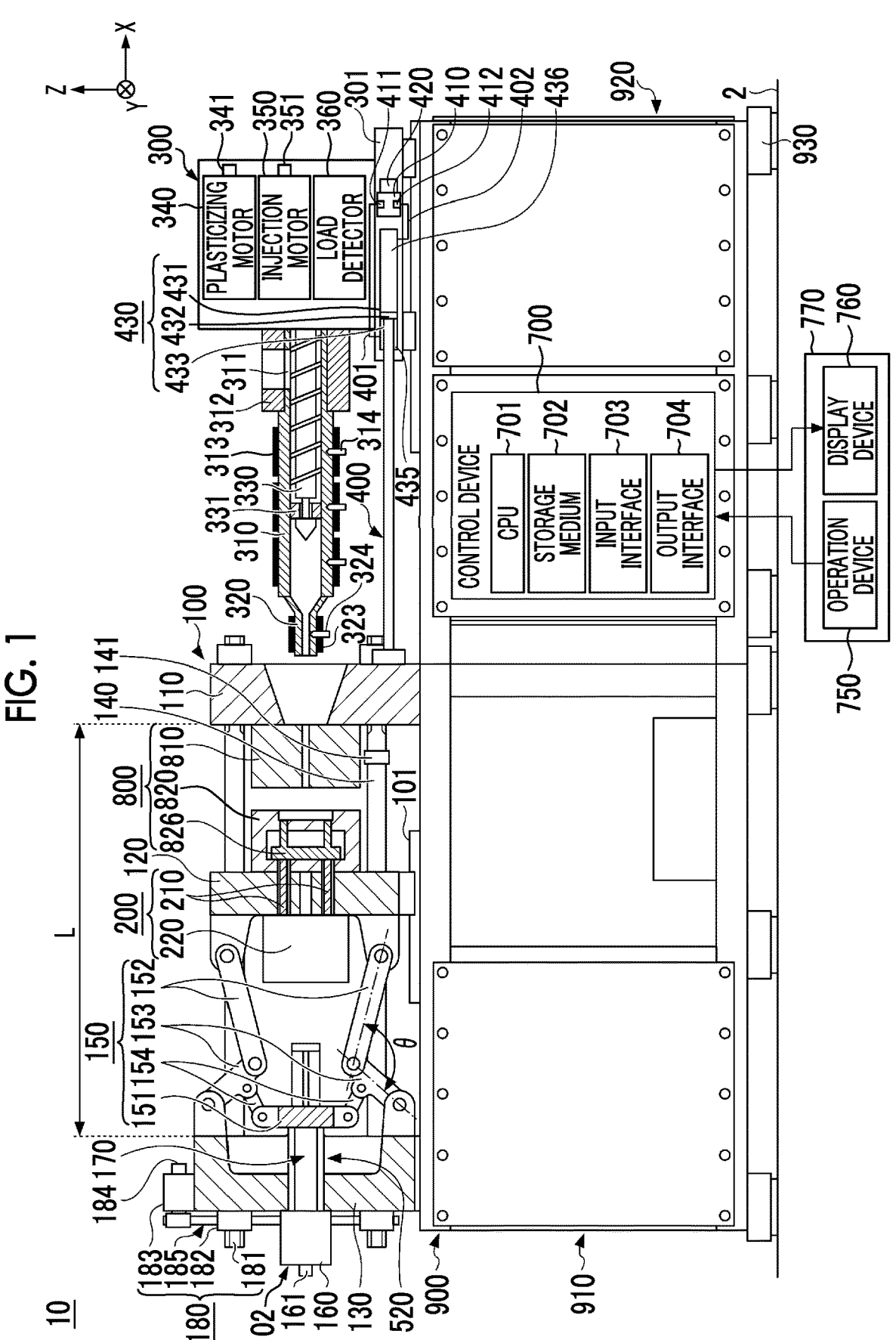
FIG. 1 is a view showing a state when mold opening is completed in an injection molding machine according to an embodiment.

According to the aspect of the present invention, by controlling the range of increase in the actual value of the mold clamping force after the molding material reaches the parting surfaces to the upper limit or less, leakage of the molding material can be prevented, and molding defects can be suppressed.

Hereinafter, embodiments of the present invention will be described with reference to the drawings. In each drawing, the same or corresponding reference numerals will be assigned to the same or corresponding configurations, and description thereof will be omitted.

Injection Molding Machine

Figure 2:
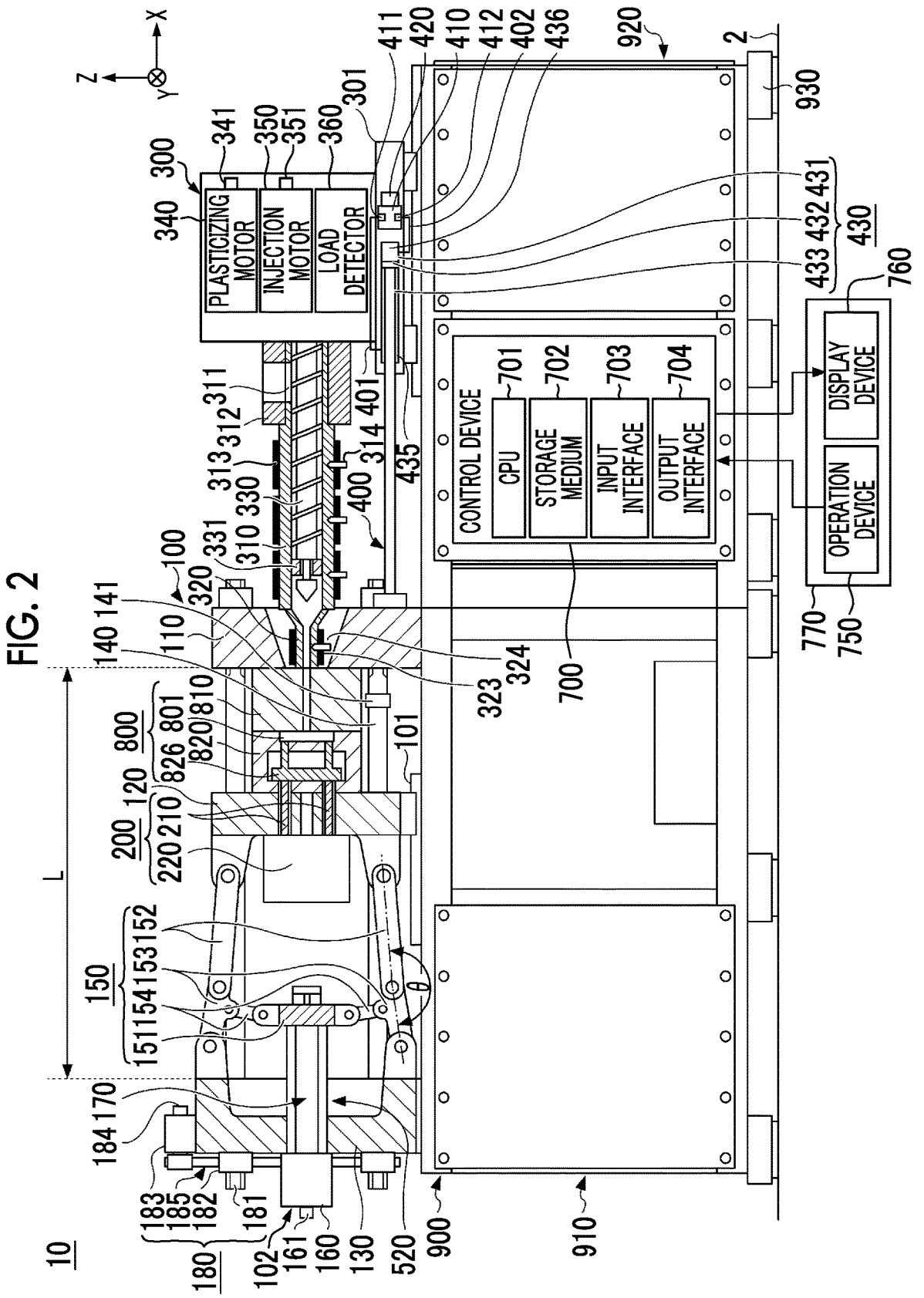
FIG. 2 is a view showing a state when mold clamping is performed in the injection molding machine according to the embodiment.

FIG. 1 is a view showing a state when mold opening is completed in an injection molding machine according to an embodiment. FIG. 2 is a view showing a state when mold clamping is performed in the injection molding machine according to the embodiment. In the present specification, an X-axis direction, a Y-axis direction, and a Z-axis direction are perpendicular to each other. The X-axis direction and the Y-axis direction represent a horizontal direction, and the Z-axis direction represents a vertical direction. In a case where a mold clamping unit 100 is of a horizontal type, the X-axis direction represents a mold opening and closing direction, and the Y-axis direction represents a width direction of an injection molding machine 10. A negative side in the Y-axis direction will be referred to as an operation side, and a positive side in the Y-axis direction will be referred to as a counter operation side.

As shown in FIGS. 1 and 2, the injection molding machine 10 includes the mold clamping unit 100 that opens and closes a mold unit 800, an ejector unit 200 that ejects a molding product molded by the mold unit 800, an injection unit 300 that injects a molding material into the mold unit 800, a moving unit 400 that causes the injection unit 300 to advance and retreat with respect to the mold unit 800, a control device 700 that controls each component of the injection molding machine 10, and a frame 900 that supports each component of the injection molding machine 10. The frame 900 includes a mold clamping unit frame 910 that supports the mold clamping unit 100, and an injection unit frame 920 that supports the injection unit 300. The mold clamping unit frame 910 and the injection unit frame 920 are respectively installed on a floor 2 via a leveling adjuster 930. The control device 700 is disposed in an internal space of the injection unit frame 920. Hereinafter, each component of the injection molding machine 10 will be described.

Mold Clamping Unit

In describing the mold clamping unit 100, a moving direction of a movable platen 120 during mold closing (for example, a positive direction of an X-axis) will be defined as forward, and a moving direction of the movable platen 120 during mold opening (for example, a negative direction of the X-axis) will be defined as rearward.

The mold clamping unit 100 performs mold closing, pressurizing, mold clamping, depressurizing, and mold opening of the mold unit 800. The mold unit 800 includes a stationary mold 810 and a movable mold 820.

For example, the mold clamping unit 100 is of a horizontal type, and the mold opening and closing direction is a horizontal direction. The mold clamping unit 100 includes a stationary platen 110 to which the stationary mold 810 is attached, the movable platen 120 to which the movable mold 820 is attached, and a moving mechanism 102 that moves the movable platen 120 in the mold opening and closing direction with respect to the stationary platen 110.

The stationary platen 110 is fixed to the mold clamping unit frame 910. The stationary mold 810 is attached to a surface of the stationary platen 110 facing the movable platen 120.

The movable platen 120 is disposed to be movable in the mold opening and closing direction with respect to the mold clamping unit frame 910. A guide 101 that guides the movable platen 120 is laid on the mold clamping unit frame 910. The movable mold 820 is attached to a surface of the movable platen 120 facing the stationary platen 110.

The moving mechanism 102 causes the movable platen 120 to advance and retreat with respect to the stationary platen 110 such that mold closing, pressurizing, mold clamping, depressurizing, and mold opening of the mold unit 800 are performed. The moving mechanism 102 includes a toggle support 130 disposed at an interval from the stationary platen 110, a tie bar 140 that connects the stationary platen 110 and the toggle support 130 to each other, a toggle mechanism 150 that moves the movable platen 120 in the mold opening and closing direction with respect to the toggle support 130, a mold clamping motor 160 that operates the toggle mechanism 150, a motion conversion mechanism 170 that converts a rotary motion into a linear motion of the mold clamping motor 160, and a mold space adjustment mechanism 180 that adjusts an interval between the stationary platen 110 and the toggle support 130.

The toggle support 130 is disposed at an interval from the stationary platen 110, and is placed on the mold clamping unit frame 910 to be movable in the mold opening and closing direction. The toggle support 130 may be disposed to be movable along a guide laid on the mold clamping unit frame 910. The guide of the toggle support 130 may be common to the guide 101 of the movable platen 120.

In the present embodiment, the stationary platen 110 is fixed to the mold clamping unit frame 910, and the toggle support 130 is disposed to be movable in the mold opening and closing direction with respect to the mold clamping unit frame 910. However, the toggle support 130 may be fixed to the mold clamping unit frame 910, and the stationary platen 110 may be disposed to be movable in the mold opening and closing direction with respect to the mold clamping unit frame 910.

The tie bar 140 connects the stationary platen 110 and the toggle support 130 to each other at an interval L in the mold opening and closing direction. A plurality of (for example, four) tie bars 140 may be used. The plurality of tie bars 140 are disposed parallel to each other in the mold opening and closing direction, and extend in accordance with a mold clamping force. At least one of the tie bars 140 may be provided with a tie bar strain detector 141 that measures a strain of the tie bar 140. The tie bar strain detector 141 transmits a signal indicating a measurement result thereof to the control device 700. The measurement result of the tie bar strain detector 141 is used in measuring the mold clamping force.

In the present embodiment, as a mold clamping force detector for measuring the mold clamping force, the tie bar strain detector 141 is used. However, the present invention is not limited thereto. The mold clamping force detector is not limited to a strain gauge type. The mold clamping force detector may be of a piezoelectric type, a capacitive type, a hydraulic type, or an electromagnetic type, and an attachment position thereof is not limited to the tie bar 140.

The toggle mechanism 150 is disposed between the movable platen 120 and the toggle support 130, and moves the movable platen 120 in the mold opening and closing direction with respect to the toggle support 130. The toggle mechanism 150 has a crosshead 151 that moves in the mold opening and closing direction, and a pair of link groups bent and stretched by a movement of the crosshead 151. Each of the pair of link groups has a first link 152 and a second link 153 which are connected to be freely bent and stretched by a pin. The first link 152 is oscillatingly attached to the movable platen 120 by a pin. The second link 153 is oscillatingly attached to the toggle support 130 by a pin. The second link 153 is attached to the crosshead 151 via a third link 154. When the crosshead 151 is caused to advance and retreat with respect to the toggle support 130, the first link 152 and the second link 153 are bent and stretched, and the movable platen 120 advances and retreats with respect to the toggle support 130.

A configuration of the toggle mechanism 150 is not limited to configurations shown in FIGS. 1 and 2. For example, in FIGS. 1 and 2, the number of nodes in each link group is five, but may be four. One end portion of the third link 154 may be connected to the node between the first link 152 and the second link 153.

The mold clamping motor 160 is attached to the toggle support 130, and operates the toggle mechanism 150. The mold clamping motor 160 causes the crosshead 151 to advance and retreat with respect to the toggle support 130 such that the first link 152 and the second link 153 are bent and stretched and the movable platen 120 advances and retreats with respect to the toggle support 130. The mold clamping motor 160 is directly connected to the motion conversion mechanism 170, but may be connected to the motion conversion mechanism 170 via a belt or a pulley.

The motion conversion mechanism 170 converts a rotary motion of the mold clamping motor 160 into a linear motion of the crosshead 151. The motion conversion mechanism 170 includes a screw shaft and a screw nut screwed to the screw shaft. A ball or a roller may be interposed between the screw shaft and the screw nut.

The mold clamping unit 100 performs a mold closing process, a pressurizing process, a mold clamping process, a depressurizing process, and a mold opening process under the control of the control device 700.

In the mold closing process, the mold clamping motor 160 is driven to cause the crosshead 151 to advance to a mold closing completion position at a set movement speed, thereby causing the movable platen 120 to advance such that the movable mold 820 touches the stationary mold 810. For example, a position or a movement speed of the crosshead 151 is measured by using a mold clamping motor encoder 161. The mold clamping motor encoder 161 measures rotation of the mold clamping motor 160, and transmits a signal indicating a measurement result thereof to the control device 700.

A crosshead position detector for measuring a position of the crosshead 151 and a crosshead movement speed detector for measuring a movement speed of the crosshead 151 are not limited to the mold clamping motor encoder 161, and a general detector can be used. In addition, a movable platen position detector for measuring a position of the movable platen 120 and a movable platen movement speed detector for measuring a movement speed of the movable platen 120 are not limited to the mold clamping motor encoder 161, and a general detector can be used.

In the pressurizing process, the mold clamping motor 160 is further driven to cause the crosshead 151 to further advance from the mold closing completion position to a mold clamping position, thereby generating a mold clamping force.

In the mold clamping process, the mold clamping motor 160 is driven to maintain the position of the crosshead 151 at the mold clamping position. In the mold clamping process, the mold clamping force generated in the pressurizing process is maintained. In the mold clamping process, a cavity space 801 (refer to FIG. 2) is formed between the movable mold 820 and the stationary mold 810, and the injection unit 300 fills the cavity space 801 with a liquid molding material. A molding product is obtained by solidifying the molding material filled therein.

The number of the cavity spaces 801 may be one or more. In the latter case, a plurality of the molding products can be obtained at the same time. An insert material may be disposed in a portion of the cavity space 801, and the other portion of the cavity space 801 may be filled with the molding material. A molding product in which the insert material and the molding material are integrated with each other can be obtained.

In the depressurizing process, the mold clamping motor 160 is driven to cause the crosshead 151 to retreat from the mold clamping position to a mold opening start position such that the movable platen 120 retreats to reduce the mold clamping force. The mold opening start position and the mold closing completion position may be the same position.

In the mold opening process, the mold clamping motor 160 is driven to cause the crosshead 151 to retreat from the mold opening start position to a mold opening completion position at a set movement speed such that the movable platen 120 retreats and the movable mold 820 is separated from the stationary mold 810. Thereafter, the ejector unit 200 ejects the molding product from the movable mold 820.

Setting conditions in the mold closing process, the pressurizing process, and the mold clamping process are collectively set as a series of setting conditions. For example, the movement speed or positions (including a mold closing start position, a movement speed switching position, the mold closing completion position, and the mold clamping position) of the crosshead 151 and the mold clamping force in the mold closing process and in the pressurizing process are collectively set as a series of setting conditions. The mold closing start position, the movement speed switching position, the mold closing completion position, and the mold clamping position are aligned in this order from a rear side toward a front side, and represent a start point and an end point of a section in which the movement speed is set. The movement speed is set for each section. The number of the movement speed switching positions may be one or more. The movement speed switching position may not be set. Only one of the mold clamping position and the mold clamping force may be set.

The setting conditions in the depressurizing process and in the mold opening process are set in the same manner. For example, the movement speed or positions (the mold opening start position, the movement speed switching position, and the mold opening completion position) of the crosshead 151 in the depressurizing process and in the mold opening process are collectively set as a series of setting conditions. The mold opening start position, the movement speed switching position, and the mold opening completion position are aligned in this order from the front side toward the rear side, and represent the start point and the end point of the section in which the movement speed is set. The movement speed is set for each section. The number of the movement speed switching positions may be one or more. The movement speed switching position may not be set. The mold opening start position and the mold closing completion position may be the same position. In addition, the mold opening completion position and the mold closing start position may be the same position.

Instead of the movement speed, positions, and the like of the crosshead 151, the movement speed, positions, and the like of the movable platen 120 may be set. In addition, instead of the position (for example, the mold clamping position) of the crosshead 151 or the position of the movable platen 120, the mold clamping force may be set.

The toggle mechanism. 150 amplifies a driving force of the mold clamping motor 160, and transmits the driving force to the movable platen 120. An amplification magnification is referred to as a toggle magnification. The toggle magnification is changed according to an angle θ (hereinafter, also referred to as a "link angle θ") formed between the first link 152 and the second link 153. The link angle θ is obtained from the position of the crosshead 151. When the link angle θ is 180°, the toggle magnification is maximized.

In a case where a mold space of the mold unit 800 is changed due to replacement of the mold unit 800 or a temperature change in the mold unit 800, mold space adjustment is performed so that a predetermined mold clamping force is obtained during the mold clamping. For example, in the mold space adjustment, the interval L between the stationary platen 110 and the toggle support 130 is adjusted so that the link angle θ of the toggle mechanism 150 becomes a predetermined angle at a mold touch time at which the movable mold 820 touches the stationary mold 810.

The mold clamping unit 100 has the mold space adjustment mechanism 180. The mold space adjustment mechanism 180 performs the mold space adjustment by adjusting the interval L between the stationary platen 110 and the toggle support 130. For example, a time for the mold space adjustment is determined from an end point of a molding cycle to a start point of a subsequent molding cycle. For example, the mold space adjustment mechanism 180 has a screw shaft 181 formed in a rear end portion of the tie bar 140, a screw nut 182 held by the toggle support 130 to be rotatable and not to advance and retreat, and a mold space adjustment motor 183 that rotates the screw nut 182 screwed to the screw shaft 181.

The screw shaft 181 and the screw nut 182 are provided for each of the tie bars 140. A rotational driving force of the mold space adjustment motor 183 may be transmitted to a plurality of the screw nuts 182 via a rotational driving force transmitting unit 185. The plurality of screw nuts 182 can be rotated in synchronization with each other. The plurality of screw nuts 182 can be individually rotated by changing a transmission channel of the rotational driving force transmitting unit 185.

For example, the rotational driving force transmitting unit 185 is configured to include a gear. In this case, a driven gear is formed on an outer periphery of each screw nut 182, a driving gear is attached to an output shaft of the mold space adjustment motor 183, and a plurality of intermediate gears meshing with the driven gear and the driving gear are held to be rotatable in a central portion of the toggle support 130. The rotational driving force transmitting unit 185 may be configured to include a belt or a pulley instead of the gear.

An operation of the mold space adjustment mechanism 180 is controlled by the control device 700. The control device 700 drives the mold space adjustment motor 183 to rotate the screw nut 182. As a result, a position of the toggle support 130 with respect to the tie bar 140 is adjusted, and the interval L between the stationary platen 110 and the toggle support 130 is adjusted. In addition, a plurality of the mold space adjustment mechanisms may be used in combination.

The interval L is measured by using a mold space adjustment motor encoder 184. The mold space adjustment motor encoder 184 measures a rotation amount or a rotation direction of the mold space adjustment motor 183, and transmits a signal indicating a measurement result thereof to the control device 700. The measurement result of the mold space adjustment motor encoder 184 is used in monitoring or controlling the position or the interval L of the toggle support 130. A toggle support position detector for measuring the position of the toggle support 130 and an interval detector for measuring the interval L are not limited to the mold space adjustment motor encoder 184, and a general detector can be used.

The mold clamping unit 100 may include a mold temperature controller that adjusts the temperature of the mold unit 800. The mold unit 800 internally has a flow path of a temperature control medium. The mold temperature controller adjusts the temperature of the mold unit 800 by adjusting a temperature of the temperature control medium supplied to the flow path of the mold unit 800.

The mold clamping unit 100 of the present embodiment is of the horizontal type in which the mold opening and closing direction is the horizontal direction, but may be of a vertical type in which the mold opening and closing direction is an upward-downward direction.

The mold clamping unit 100 of the present embodiment has the mold clamping motor 160 as a drive unit. However, a hydraulic cylinder may be provided instead of the mold clamping motor 160. In addition, the mold clamping unit 100 may have a linear motor for mold opening and closing, and may have an electromagnet for mold clamping.

Ejector Unit

In describing the ejector unit 200, similarly to the description of the mold clamping unit 100, a moving direction of the movable platen 120 during the mold closing (for example, the positive direction of the X-axis) will be defined as forward, and a moving direction of the movable platen 120 during the mold opening (for example, the negative direction of the X-axis) will be defined as rearward.

The ejector unit 200 is attached to the movable platen 120, and advances and retreats together with the movable platen 120. The ejector unit 200 has an ejector rod 210 that ejects a molding product from the mold unit 800, and a drive mechanism 220 that moves the ejector rod 210 in the moving direction (X-axis direction) of the movable platen 120.

The ejector rod 210 is disposed to be able to advance and retreat in a through-hole of the movable platen 120. A front end portion of the ejector rod 210 comes into contact with an ejector plate 826 of the movable mold 820. The front end portion of the ejector rod 210 may be connected to or may not be connected to the ejector plate 826.

For example, the drive mechanism 220 has an ejector motor and a motion conversion mechanism that converts a rotary motion of the ejector motor into a linear motion of the ejector rod 210. The motion conversion mechanism includes a screw shaft and a screw nut screwed to the screw shaft. A ball or a roller may be interposed between the screw shaft and the screw nut.

The ejector unit 200 performs an ejection process under the control of the control device 700. In the ejection process, the ejector rod 210 is caused to advance from a standby position to an ejection position at a set movement speed such that the ejector plate 826 advances to eject the molding product. Thereafter, the ejector motor is driven to cause the ejector rod 210 to retreat at a set movement speed such that the ejector plate 826 retreats to an original standby position.

For example, a position or a movement speed of the ejector rod 210 is measured by using an ejector motor encoder. The ejector motor encoder measures the rotation of the ejector motor, and transmits a signal indicating a measurement result thereof to the control device 700. An ejector rod position detector for measuring the position of the ejector rod 210, and an ejector rod movement speed detector for measuring the movement speed of the ejector rod 210 are not limited to the ejector motor encoder, and a general detector can be used.

Injection Unit

In describing the injection unit 300, unlike the description of the mold clamping unit 100 or the description of the ejector unit 200, a moving direction of a screw 330 during filling (for example, the negative direction of the X-axis) will be defined as forward, and a moving direction of the screw 330 during plasticizing (for example, the positive direction of the X-axis) will be defined as rearward.

The injection unit 300 is installed on a slide base 301, and the slide base 301 is disposed to be able to advance and retreat with respect to the injection unit frame 920. The injection unit 300 is disposed to be able to advance and retreat with respect to the mold unit 800. The injection unit 300 touches the mold unit 800, and fills the cavity space 801 inside the mold unit 800 with the molding material. For example, the injection unit 300 has a cylinder 310 that heats the molding material, a nozzle 320 provided in a front end portion of the cylinder 310, the screw 330 disposed to be able to advance and retreat and to rotate inside the cylinder 310, a plasticizing motor 340 that rotates the screw 330, an injection motor 350 that causes the screw 330 to advance and retreat, and a load detector 360 that measures a load transmitted between the injection motor 350 and the screw 330.

The cylinder 310 heats the molding material supplied into the cylinder 310 from a feed port 311. For example, the molding material includes a resin. For example, the molding material is formed in a pellet shape, and is supplied to the feed port 311 in a solid state. The feed port 311 is formed in a rear portion of the cylinder 310. A cooler 312 such as a water-cooling cylinder is provided on an outer periphery of the rear portion of the cylinder 310. In front of the cooler 312, a first heating unit 313 such as a band heater and a first temperature measurer 314 are provided on an outer periphery of the cylinder 310.

The cylinder 310 is divided into a plurality of zones in an axial direction (for example, the X-axis direction) of the cylinder 310. The first heating unit 313 and the first temperature measurer 314 are provided in each of the plurality of zones. The control device 700 controls the first heating unit 313 so that a set temperature is set in each of the plurality of zones and a measurement temperature of the first temperature measurer 314 reaches the set temperature.

The nozzle 320 is provided in a front end portion of the cylinder 310, and is pressed against the mold unit 800. A second heating unit 323 and a second temperature measurer 324 are provided on an outer periphery of the nozzle 320. The control device 700 controls the second heating unit 323 so that a measurement temperature of the nozzle 320 reaches the set temperature.

The screw 330 is disposed to be able to rotate and to advance and retreat inside the cylinder 310. When the screw 330 is rotated, the molding material is fed forward along a helical groove of the screw 330. The molding material is gradually melted by heat from the cylinder 310 while being fed forward. As the liquid molding material is fed forward of the screw 330 and is accumulated in a front portion of the cylinder 310, the screw 330 retreats. Thereafter, when the screw 330 is caused to advance, the liquid molding material accumulated in front of the screw 330 is injected from the nozzle 320, and fills an inside of the mold unit 800.

As a backflow prevention valve for preventing a backflow of the molding material fed rearward from the front of the screw 330 when the screw 330 is pressed forward, a backflow prevention ring 331 is attached to a front portion of the screw 330 to be able to advance and retreat.

The backflow prevention ring 331 is pressed rearward by a pressure of the molding material in front of the screw 330 when the screw 330 is caused to advance, and retreats relative to the screw 330 to a close position (refer to FIG. 2) at which a flow path of the molding material is closed. Accordingly, the molding material accumulated in front of the screw 330 is prevented from flowing rearward.

On the other hand, the backflow prevention ring 331 is pressed forward by the pressure of the molding material fed forward along the helical groove of the screw 330 when the screw 330 is rotated, and advances relative to the screw. 330 to an open position (refer to FIG. 1) at which the flow path of the molding material is open. Accordingly, the molding material is fed forward of the screw 330.

The backflow prevention ring 331 may be of either a co-rotation type rotating together with the screw 330 or a non-co-rotation type that does not rotate together with the screw 330.

The injection unit 300 may have a drive source that causes the backflow prevention ring 331 to advance and retreat with respect to the screw 330 between the open position and the close position.

The plasticizing motor 340 rotates the screw 330. The drive source for rotating the screw 330 is not limited to the plasticizing motor 340, and may be a hydraulic pump, for example.

The injection motor 350 causes the screw 330 to advance and retreat. A motion conversion mechanism that converts a rotary motion of the injection motor 350 into a linear motion of the screw 330 or the like is provided between the injection motor 350 and the screw 330. For example, the motion conversion mechanism has a screw shaft and a screw nut screwed to the screw shaft. A ball or a roller may be provided between the screw shaft and the screw nut. A drive source that causes the screw 330 to advance and retreat is not limited to the injection motor 350, and may be a hydraulic cylinder, for example.

The load detector 360 measures a load transmitted between the injection motor 350 and the screw 330. The measured load is converted into a pressure by the control device 700. The load detector 360 is provided in a load transmission channel between the injection motor 350 and the screw 330, and measures the load acting on the load detector 360.

The load detector 360 transmits a signal of the measured load to the control device 700. The load measured by the load detector 360 is converted into the pressure acting between the screw 330 and the molding material, and is used in controlling or monitoring the pressure received from the molding material by the screw 330, a back pressure against the screw 330, or the pressure acting on the molding material from the screw 330.

A pressure detector for measuring the pressure of the molding material is not limited to the load detector 360, and a general detector can be used. For example, a nozzle pressure sensor or a mold internal pressure sensor may be used. The nozzle pressure sensor is installed in the nozzle 320. The mold internal pressure sensor is installed inside the mold unit 800.

The injection unit 300 performs a plasticizing process, a filling process, and a holding pressure process under the control of the control device 700. The filling process and the holding pressure process may be collectively referred to as an injection process.

In the plasticizing process, the plasticizing motor 340 is driven to rotate the screw 330 at a set rotational speed such that the molding material is fed forward along the helical groove of the screw 330. As a result, the molding material is gradually melted. As the liquid molding material is fed forward of the screw 330 and is accumulated in a front portion of the cylinder 310, the screw 330 retreats. For example, a rotational speed of the screw 330 is measured by using a plasticizing motor encoder 341. The plasticizing motor encoder 341 measures the rotation of the plasticizing motor 340, and transmits a signal indicating a measurement result thereof to the control device 700. A screw rotational speed detector for measuring the rotational speed of the screw. 330 is not limited to the plasticizing motor encoder 341, and a general detector can be used.

In the plasticizing process, the injection motor 350 may be driven to apply a set back pressure to the screw 330 in order to limit a sudden retreat of the screw 330. The back pressure applied to the screw 330 is measured by using the load detector 360, for example. When the screw 330 retreats to a plasticizing completion position and a predetermined amount of the molding material is accumulated in front of the screw 330, the plasticizing process is completed.

The position and the rotational speed of the screw 330 in the plasticizing process are collectively set as a series of setting conditions. For example, a plasticizing start position, a rotational speed switching position, and a plasticizing completion position are set. These positions are aligned in this order from the front side toward the rear side, and represent the start point and the end point of the section in which the rotational speed is set. The rotational speed is set for each section. The number of the rotational speed switching positions may be one or more. The rotational speed switching position may not be set. In addition, the back pressure is set for each section.

In the filling process, the injection motor 350 is driven to cause the screw 330 to advance at a set movement speed, and the cavity space 801 inside the mold unit 800 is filled with the liquid molding material accumulated in front of the screw 330. The position or the movement speed of the screw 330 is measured by using an injection motor encoder 351, for example. The injection motor encoder 351 measures the rotation of the injection motor 350, and transmits a signal indicating a measurement result thereof to the control device 700. When the position of the screw 330 reaches a set position, the filling process is switched to the holding pressure process (so-called V/P switching). The position where the V/P switching is performed will be referred to as a V/P switching position. The set movement speed of the screw 330 may be changed in accordance with the position, a time, or the like of the screw 330.

The position and the movement speed of the screw 330 in the filling process are collectively set as a series of setting conditions. For example, a filling start position (also referred to as an "injection start position"), the movement speed switching position, and the V/P switching position are set. These positions are aligned in this order from the rear side toward the front side, and represent the start point and the end point of the section in which the movement speed is set. The movement speed is set for each section. The number of the movement speed switching positions may be one or more. The movement speed switching position may not be set.

An upper limit of the pressure of the screw 330 is set for each section in which the movement speed of the screw 330 is set. The pressure of the screw 330 is measured by the load detector 360. In a case where the pressure of the screw 330 is equal to or lower than a setting pressure, the screw 330 advances at a set movement speed. On the other hand, in a case where the pressure of the screw 330 exceeds the setting pressure, in order to protect the mold, the screw 330 is caused to advance at a movement speed slower than the set movement speed so that the pressure of the screw 330 is equal to or lower than the setting pressure.

After the position of the screw 330 reaches the V/P switching position in the filling process, the screw 330 may be temporarily stopped at the V/P switching position, and thereafter, the V/P switching may be performed. Immediately before the V/P switching, instead of stopping the screw 330, the screw 330 may be caused to advance at a low speed, or may be caused to retreat at a low speed. In addition, a screw position detector for measuring the position of the screw 330 and a screw movement speed detector for measuring the movement speed of the screw 330 are not limited to the injection motor encoder 351, and a general detector can be used.

In the holding pressure process, the injection motor 350 is driven to press the screw 330 forward. A pressure (hereinafter, also referred to as a "holding pressure") of the molding material in the front end portion of the screw 330 is held at a setting pressure, and the molding material remaining inside the cylinder 310 is pressed toward the mold unit 800.

An insufficient amount of the molding material due to cooling shrinkage inside the mold unit 800 can be replenished. The holding pressure is measured by using the load detector 360, for example. A set value of the holding pressure may be changed depending on an elapsed time from the start of the holding pressure process. A plurality of holding pressures and a plurality of holding times for holding the holding pressures in the holding pressure process may be respectively set, or may be collectively set as a series of setting conditions.

In the holding pressure process, the molding material in the cavity space 801 inside the mold unit 800 is gradually cooled, and when the holding pressure process is completed, an inlet of the cavity space 801 is closed by the solidified molding material. This state is referred to as gate seal, and prevents the backflow of the molding material from the cavity space 801. After the holding pressure process, a cooling process starts. In the cooling process, the molding material inside the cavity space 801 is solidified. In order to shorten a molding cycle time, the plasticizing process may be performed during the cooling process.

The injection unit 300 of the present embodiment is of an in-line screw type, but may be of a pre-plasticizing type. The injection unit of the pre-plasticizing type supplies the molding material melted inside a plasticizing cylinder to an injection cylinder, and the molding material is injected into the mold unit from the injection cylinder. Inside the plasticizing cylinder, the screw is disposed to be rotatable and not to be able to advance and retreat, or the screw is disposed to be rotatable and to be able to advance and retreat. On the other hand, a plunger is disposed to be able to advance and retreat inside the injection cylinder.

In addition, the injection unit 300 of the present embodiment is of a horizontal type in which the axial direction of the cylinder 310 is a horizontal direction, but may be of a vertical type in which the axial direction of the cylinder 310 is an upward-downward direction. The mold clamping unit combined with the injection unit 300 of the vertical type may be of the vertical type or the horizontal type. Similarly, the mold clamping unit combined with the injection unit 300 of the horizontal type may be of the horizontal type or the vertical type.

Moving Unit

In describing the moving unit 400, similarly to the description of the injection unit 300, a moving direction of the screw 330 during the filling (for example, the negative direction of the X-axis) will be defined as forward, and a moving direction of the screw 330 during the plasticizing (for example, the positive direction of the X-axis) will be defined as rearward.

The moving unit 400 causes the injection unit 300 to advance and retreat with respect to the mold unit 800. The moving unit 400 presses the nozzle 320 against the mold unit 800, thereby generating a nozzle touch pressure. The moving unit 400 includes a hydraulic pump 410, a motor 420 serving as a drive source, and a hydraulic cylinder 430 serving as a hydraulic actuator.

The hydraulic pump 410 has a first port 411 and a second port 412. The hydraulic pump 410 is a pump that can rotate in both directions, and switches rotation directions of the motor 420 such that a hydraulic fluid (for example, oil) is suctioned from any one of the first port 411 and the second port 412, and is discharged from the other to generate a hydraulic pressure. The hydraulic pump 410 can suction the hydraulic fluid from a tank, and can discharge the hydraulic fluid from any one of the first port 411 and the second port 412.

The motor 420 operates the hydraulic pump 410. The motor 420 drives the hydraulic pump 410 in a rotation direction and with a rotation torque in accordance with a control signal transmitted from the control device 700. The motor 420 may be an electric motor, or may be an electric servo motor.

The hydraulic cylinder 430 has a cylinder body 431, a piston 432, and a piston rod 433. The cylinder body 431 is fixed to the injection unit 300. The piston 432 partitions the inside of the cylinder body 431 into a front chamber 435 serving as a first chamber and into a rear chamber 436 serving as a second chamber. The piston rod 433 is fixed to the stationary platen 110.

The front chamber 435 of the hydraulic cylinder 430 is connected to the first port 411 of the hydraulic pump 410 via a first flow path 401. The hydraulic fluid discharged from the first port 411 is supplied to the front chamber 435 via the first flow path 401, whereby the injection unit 300 is pressed forward. The injection unit 300 advances, and the nozzle 320 is pressed against the stationary mold 810. The front chamber 435 functions as a pressure chamber that generates the nozzle touch pressure of the nozzle 320 by means of the pressure of the hydraulic fluid supplied from the hydraulic pump 410.

On the other hand, the rear chamber 436 of the hydraulic cylinder 430 is connected to the second port 412 of the hydraulic pump 410 via a second flow path 402. The hydraulic fluid discharged from the second port 412 is supplied to the rear chamber 436 of the hydraulic cylinder 430 via the second flow path 402, whereby the injection unit 300 is pressed rearward. The injection unit 300 retreats, and the nozzle 320 is separated from the stationary mold 810.

In the present embodiment, the moving unit 400 includes the hydraulic cylinder 430, but the present invention is not limited thereto. For example, instead of the hydraulic cylinder 430, an electric motor and a motion conversion mechanism that converts a rotary motion of the electric motor into a linear motion of the injection unit 300 may be used.
Control Device For example, the control device 700 is configured to include a computer, and has a central processing unit (CPU) 701, a storage medium 702 such as a memory, an input interface 703, and an output interface 704 as shown in FIGS. 1 and 2. The control device 700 performs various types of control by causing the CPU 701 to execute a program stored in the storage medium 702. In addition, the control device 700 receives a signal from the outside through the input interface 703, and transmits the signal to the outside through the output interface 704.

The control device 700 repeatedly performs the plasticizing process, the mold closing process, the pressurizing process, the mold clamping process, the filling process, the holding pressure process, the cooling process, the depressurizing process, the mold opening process, and the ejection process, thereby repeatedly manufacturing the molding product. A series of operations for obtaining the molding product, for example, an operation from the start of the plasticizing process to the start of the subsequent plasticizing process, will be referred to as a "shot" or a "molding cycle". In addition, a time required for one shot will be referred to as a "molding cycle time" or a "cycle time".

For example, one molding cycle has the plasticizing process, the mold closing process, the pressurizing process, the mold clamping process, the filling process, the holding pressure process, the cooling process, the depressurizing process, the mold opening process, and the ejection process in this order. The order described here is the order of the start times of the respective processes. The filling process, the holding pressure process, and the cooling process are performed during the mold clamping process. The start of the mold clamping process may coincide with the start of the filling process. The completion of the depressurizing process coincides with the start of the mold opening process.

A plurality of processes may be performed at the same time in order to shorten the molding cycle time. For example, the plasticizing process may be performed during the cooling process of the previous molding cycle or may be performed during the mold clamping process. In this case, the mold closing process may be performed in an initial stage of the molding cycle. In addition, the filling process may start during the mold closing process. In addition, the ejection process may start during the mold opening process. In a case where an on-off valve for opening and closing the flow path of the nozzle 320 is provided, the mold opening process may start during the plasticizing process. The reason is as follows. Even when the mold opening process starts during the plasticizing process, when the on-off valve closes the flow path of the nozzle 320, the molding material does not leak from the nozzle 320.

One molding cycle may include a process other than the plasticizing process, the mold closing process, the pressurizing process, the mold clamping process, the filling process, the holding pressure process, the cooling process, the depressurizing process, the mold opening process, and the ejection process.

For example, after the holding pressure process is completed and before the plasticizing process starts, a pre-plasticizing suck-back process of causing the screw 330 to retreat to a preset plasticizing start position may be performed. The pressure of the molding material accumulated in front of the screw 330 before the plasticizing process starts can be reduced, and a sudden retreat of the screw 330 when the plasticizing process starts can be prevented.

In addition, after the plasticizing process is completed and before the filling process starts, a post-plasticizing suck-back process may be performed in which the screw 330 is caused to retreat to a preset filling start position (also referred to as an "injection start position"). The pressure of the molding material accumulated in front of the screw 330 before the filling process starts can be reduced, and a leakage of the molding material from the nozzle 320 before the filling process starts can be prevented.

The control device 700 is connected to an operation device 750 that receives an input operation of a user, and a display device 760 that displays a screen. For example, the operation device 750 and the display device 760 may be integrated with each other in a form of a touch panel 770. The touch panel 770 serving as the display device 760 displays the screen under the control of the control device 700. For example, the screen of the touch panel 770 may display settings of the injection molding machine 10, and information on a current state of the injection molding machine 10. In addition, for example, the screen of the touch panel 770 may display a button for accepting the input operation of the user or an operation portion such as an input field. The touch panel 770 serving as the operation device 750 detects an input operation of the user on the screen, and outputs a signal corresponding to the input operation to the control device 700. In this manner, for example, while confirming information displayed on the screen, the user can perform settings (including an input of a set value) of the injection molding machine 10 by operating the operation portion provided on the screen. In addition, the user can operate the injection molding machine 10 corresponding to the operation portion by operating the operation portion provided on the screen. For example, the operation of the injection molding machine 10 may be an operation (including stopping) of the mold clamping unit 100, the ejector unit 200, the injection unit 300, the moving unit 400, or the like. In addition, the operation of the injection molding machine 10 may be switching between the screens displayed on the touch panel 770 serving as the display device 760.

A case has been described in which the operation device 750 and the display device 760 of the present embodiment are integrated with each other as the touch panel 770. However, both of these may be independently provided. In addition, a plurality of the operation devices 750 may be provided. The operation device 750 and the display device 760 are disposed on the operation side (a negative direction of the Y-axis) of the mold clamping unit 100 (more specifically, the stationary platen 110).

Details of Control Device

Figure 3:
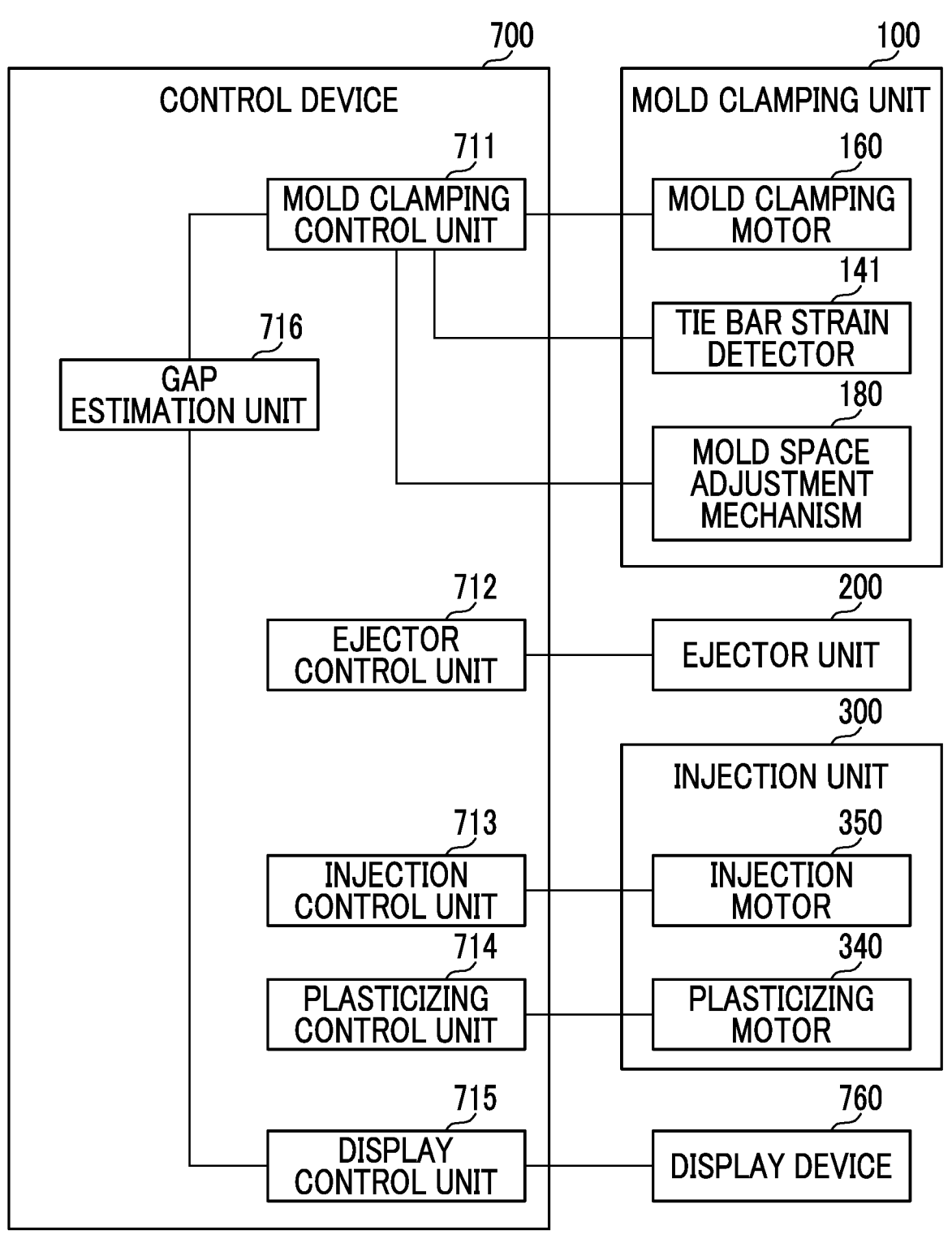
FIG. 3 is a functional block diagram showing an example of components of a control device.

Next, an example of components of the control device 700 will be described with reference to FIG. 3. Each functional block shown in FIG. 3 is conceptual, and may not necessarily be configured to be physical as shown. All or a portion of each functional block can be configured to be functionally or physically distributed and integrated in any desired unit. All or any desired portion of each processing function performed in each functional block may be realized by a program executed by a CPU, or may be realized as hardware using a wired logic.

Figure 4:
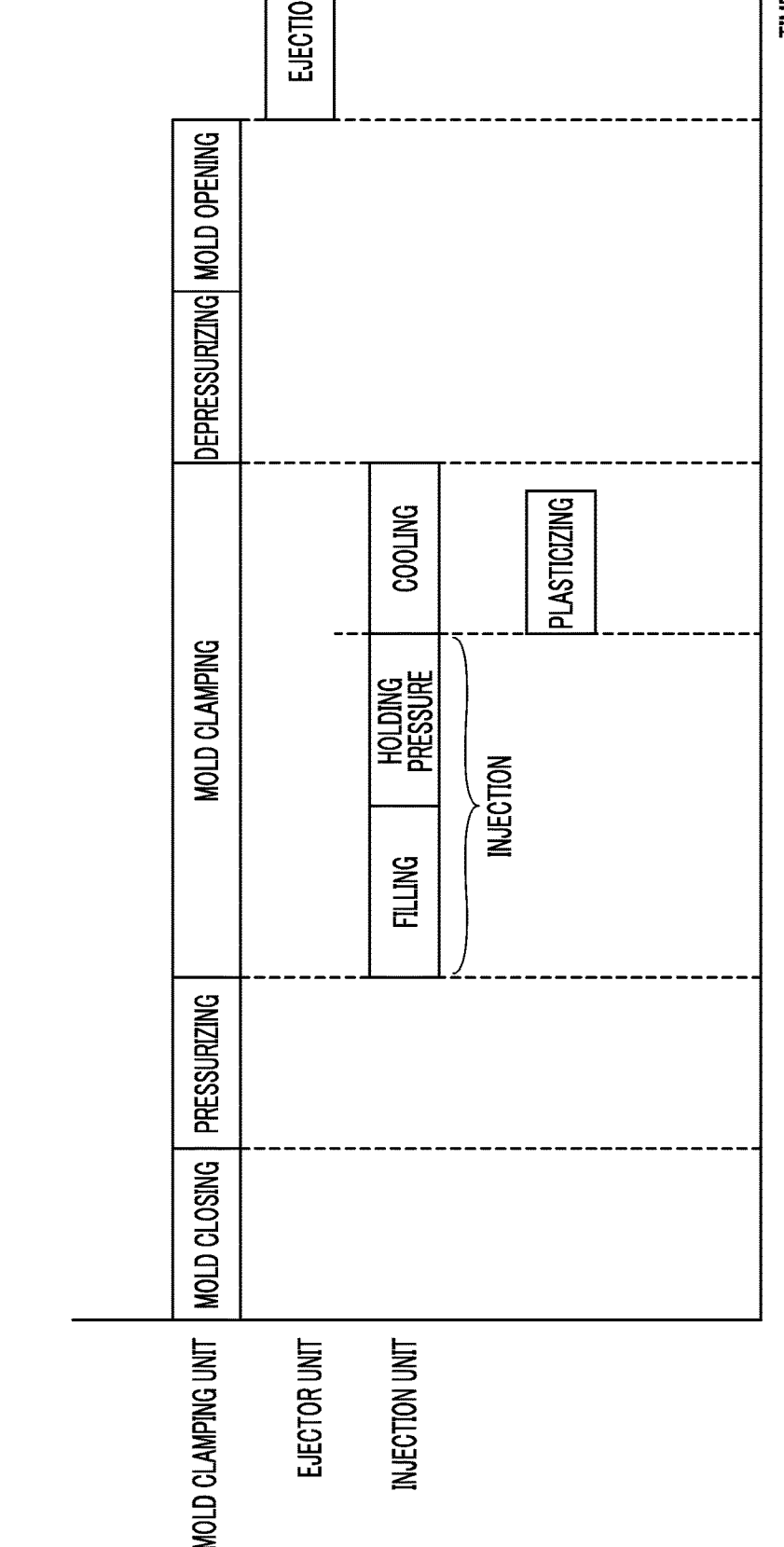
FIG. 4 is a diagram showing an example of processes of a molding cycle.

As shown in FIG. 3, for example, the control device 700 includes a mold clamping control unit 711, an ejector control unit 712, an injection control unit 713, and a plasticizing control unit 714. The mold clamping control unit 711 controls a mold clamping drive source of the mold clamping unit 100 to perform the mold closing process, the pressurizing process, the mold clamping process, the depressurizing process, and the mold opening process shown in FIG. 4. The mold clamping drive source is, for example, the mold clamping motor 160, but may be a hydraulic cylinder or the like. The ejector control unit 712 controls the ejector unit 200 to perform the ejection process. The injection control unit 713 controls an injection drive source of the injection unit 300 to perform the injection process. The injection drive source is, for example, the injection motor 350, but may be a hydraulic cylinder or the like. The injection process includes the filling process and the holding pressure process. The injection process is performed during the mold clamping process. The plasticizing control unit 714 controls a plasticizing drive source of the injection unit 300 to perform the plasticizing process. The plasticizing drive source is, for example, the plasticizing motor 340, but may be a hydraulic pump or the like. The plasticizing process is performed during the cooling process.

The filling process is a process of controlling the injection drive source so that an actual value of a movement speed of an injection member provided inside the cylinder 310 becomes a set value. The filling process is a process of filling the inside of the mold unit 800 with the liquid molding material accumulated in front of the injection member by moving the injection member forward. The injection member is, for example, the screw 330 (see FIGS. 1 and 2), but may be a plunger.

The movement speed of the injection member is measured by using a speed detector. The speed detector is, for example, the injection motor encoder 351. In the filling process, the injection member is caused to advance such that the pressure acting on the molding material from the injection member (hereinafter, also referred to as "filling pressure") increases. The filling process may include a process of temporarily stopping the injection member or a process of causing the injection member to retreat immediately before the holding pressure process.

The holding pressure process is a process of controlling the injection drive source so that an actual value of the filling pressure becomes a set value. The holding pressure process is a process of replenishing a shortage of the molding material due to cooling shrinkage in the mold unit 800 by pressing the injection member forward. The filling pressure is measured by using a pressure detector such as the load detector 360. As the pressure detector, a nozzle pressure sensor or a mold internal pressure sensor may be used.

The injection process is performed during the mold clamping process as described above. For example, the mold clamping control unit 711 converts a set value of the mold clamping force into a set value of the crosshead position, and controls the mold clamping motor 160 so that an actual value of the crosshead position becomes the set value. The crosshead position is a relative position of the crosshead 151 (see FIG. 2) with respect to the toggle support 130. As the crosshead 151 advances, the mold clamping force increases.

Next, an example of a molding material M flowing into the mold unit 800 will be described with reference to FIG. 5. The molding material M is, for example, a resin. The molding material M flows into the cavity space 801 inside the mold unit 800. The cavity space 801 is formed on parting surfaces 830 of the stationary mold 810 and the movable mold 820. The parting surface 830 is generally referred to as a parting line.

After being injected by the injection unit 300, the molding material M passes through a sprue (not shown) of the stationary mold 810 and flows into the cavity space 801 formed between the stationary mold 810 and the movable mold 820. Until a flow tip end of the molding material M reaches the parting surfaces 830 of the stationary mold 810 and the movable mold 820, the stationary mold 810 and the movable mold 820 are not opened even if a mold clamping force F is small, so that no burrs occur. Burrs are a phenomenon in which the molding material M leaks between the stationary mold 810 and the movable mold 820 and solidifies.

In a case where the mold clamping force F is large and a mold clamping pressure P2 is higher than a filling pressure P1, when the molding material M reaches the parting surfaces 830 of the stationary mold 810 and the movable mold 820, the stationary mold 810 and the movable mold 820 are not opened. Therefore, the molding material M does not leak and no burrs occur. The mold clamping pressure P2 is a value (P2=F/S) obtained by dividing the mold clamping force F by an area S of the parting surface 830.

However, in a case where the stationary mold 810 and the movable mold 820 are not opened, it is difficult for a gas to escape from the inside of the mold unit 800 to the outside, and the gas is compressed inside the mold unit 800 and generates heat, resulting in gas burning. Gas burning is a phenomenon in which, as the molding material M flows into the cavity space 801, the gas in the cavity space 801 is compressed and generates heat, and the molding material is carbonized.

In order to prevent leakage of the molding material M when the molding material M reaches the parting surfaces 830 of the stationary mold 810 and the movable mold 820, the mold clamping control unit 711 controls a range of increase ΔF in the actual value of the mold clamping force F to an upper limit or less. As will be described later, the larger a size of a gap is, the more the range of increase ΔF is. The mold clamping control unit 711 preferably controls the range of increase ΔF in the actual value of the mold clamping force F to be more than zero and equal to or less than the upper limit in order to form a gap sufficient to discharge the gas from between the stationary mold 810 and the movable mold 820 and to prevent leakage of the molding material M when the molding material M reaches the parting surfaces 830 of the stationary mold 810 and the movable mold 820.

Figures 5, 6:
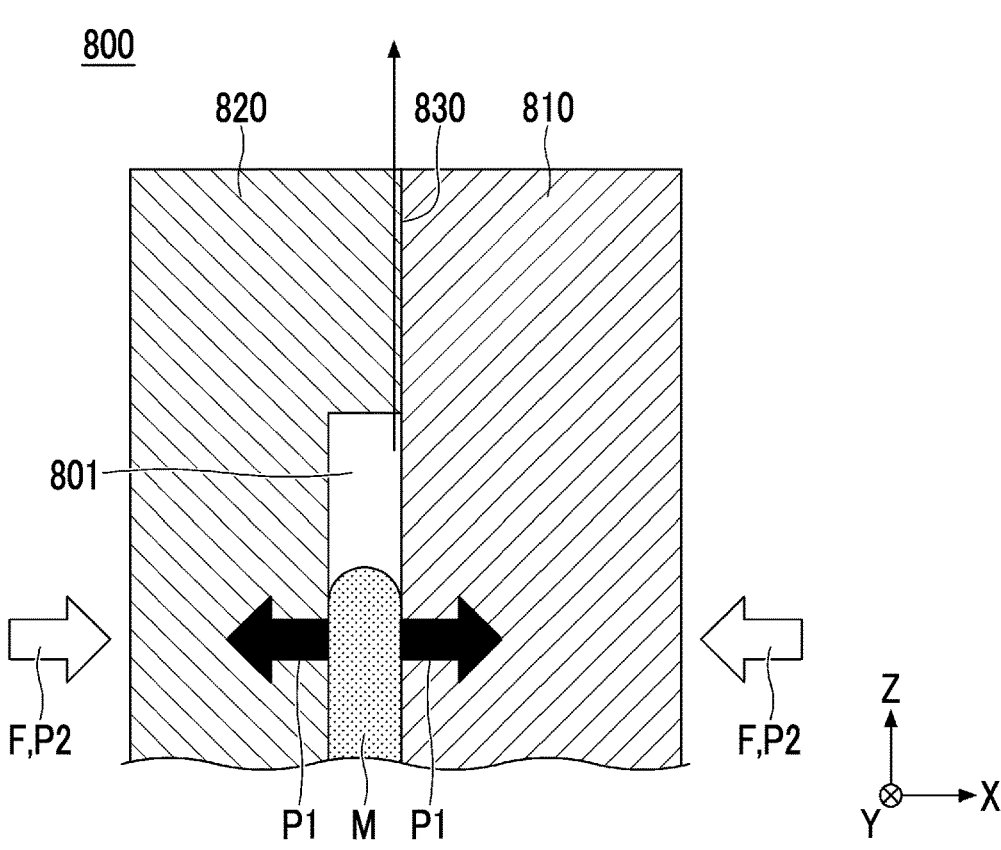
FIG. 5 is a cross-sectional view showing an example of a molding material flowing into a mold unit.
FIG. 6 is a diagram showing an example of a change in an actual value of a mold clamping force over time.

As shown in FIG. 6, the range of increase ΔF in the actual value of the mold clamping force F is a difference between the actual value of the mold clamping force F after the pressurizing of the mold clamping force F is completed and before the molding material M reaches the parting surfaces 830 of the stationary mold 810 and the movable mold 820, and a maximum value of the actual value of the mold clamping force F after the molding material M reaches the parting surfaces 830.

Next, an example of a change in the actual value of the mold clamping force F in the injection process will be described with reference to FIG. 6. In FIG. 6, a horizontal axis represents an elapsed time from the start of the injection process, and a vertical axis represents the actual value of the mold clamping force F. In the present embodiment, it is illustrated that the range of increase is controlled to be more than 0 and equal to or less than the upper limit until the filling process and the injection process are completed. The mold clamping control unit 711 acquires the actual value of the mold clamping force F by using the mold clamping force detector such as the tie bar strain detector 141.

Figure 7:
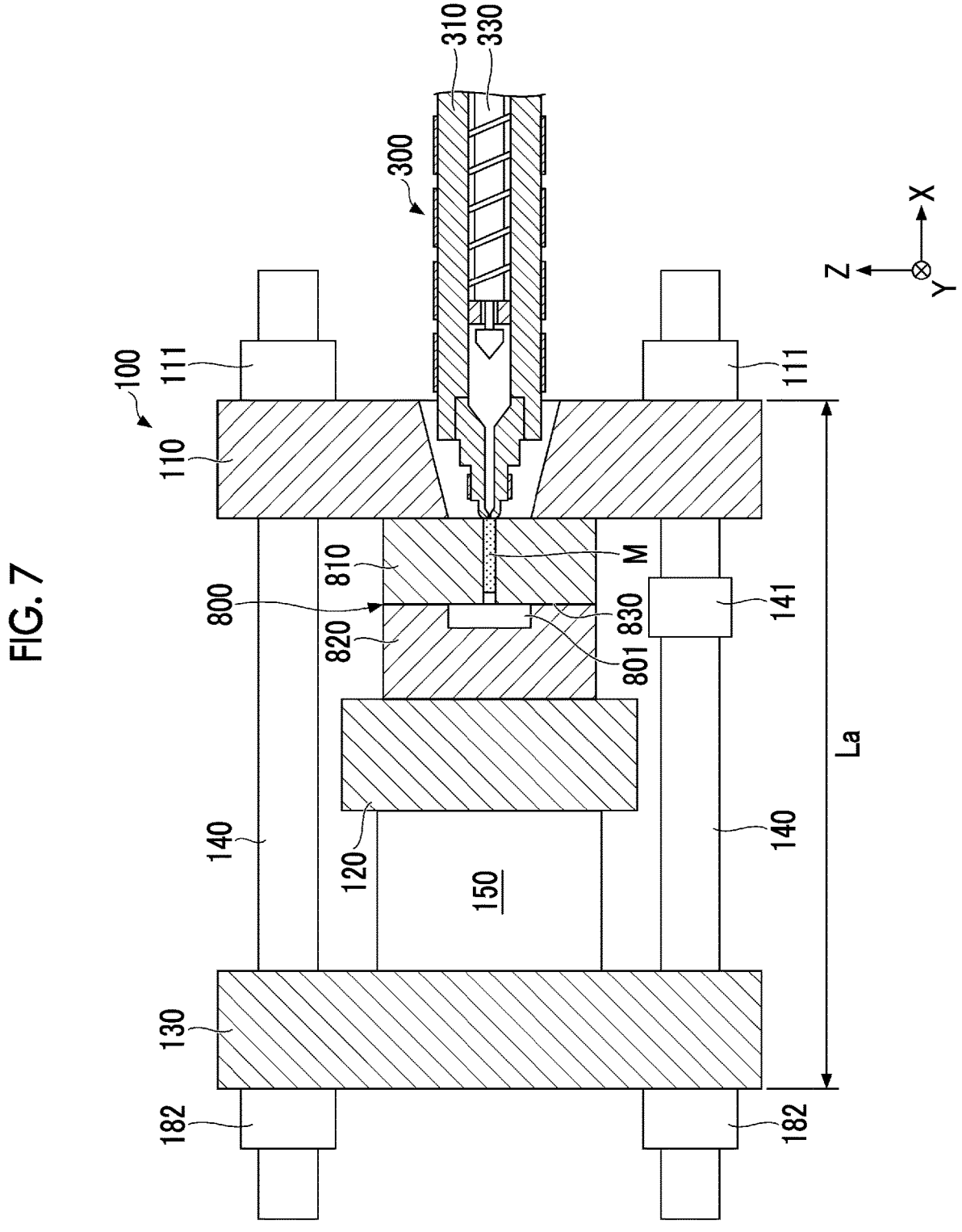
FIG. 7 is a cross-sectional view showing an example of an effective length of a tie bar at a time t1 in FIG. 6.
Figure 8:
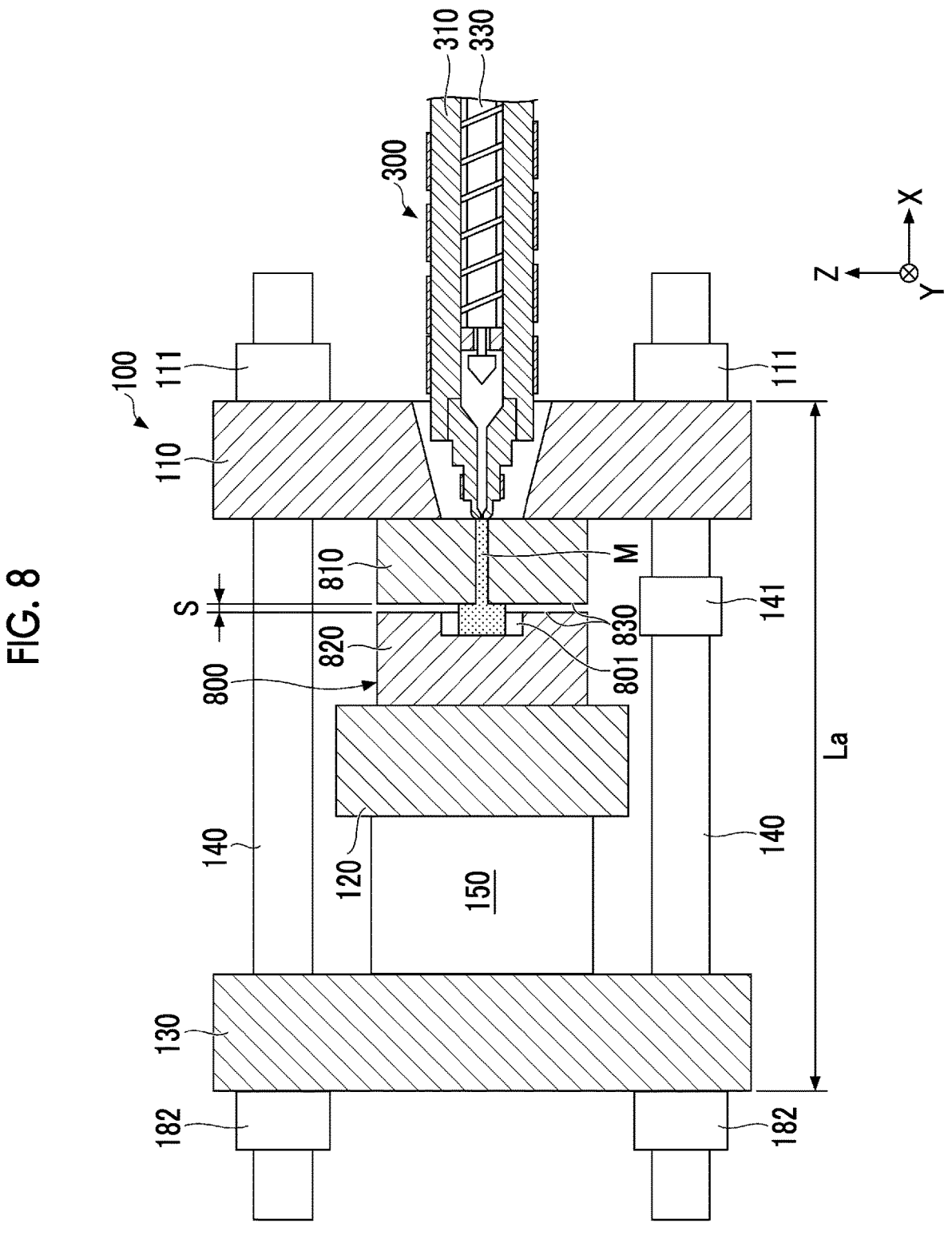
FIG. 8 is a cross-sectional view showing an example of the effective length of the tie bar at a time t2 in FIG. 6.

As shown in FIGS. 7 and 8, the tie bar strain detector 141 detects a change in an effective length La of the tie bar 140. The effective length La of the tie bar 140 is a length of a portion of the tie bar 140 that extends in accordance with the mold clamping force F. For example, the effective length La of the tie bar 140 is a length of a portion of the tie bar 140 between a fixing nut 111 and an adjustment nut 182.

The fixing nut 111 is screwed to a screw shaft formed at a front end portion of the tie bar 140, and is held so as not to rotate and not to advance and retreat with respect to the stationary platen 110. On the other hand, the adjustment nut 182 is screwed to a screw shaft formed at a rear end portion of the tie bar 140, and is held so as to rotate and not to advance and retreat with respect to the toggle support 130. The effective length La of the tie bar 140 can be adjusted by rotating the adjustment nut 182.

The effective length La of the tie bar 140 changes according to the mold clamping force F. The larger the mold clamping force F is, the longer the length La is. The tie bar strain detector 141 measures the actual value of the mold clamping force F by measuring a change in the length La. In the pressurizing process, the actual value of the mold clamping force gradually increases. After the pressurizing process is completed, the injection process is started.

As shown in FIG. 6, after the start of the injection process, the actual value of the mold clamping force F is stable at the set value until a time t0 at which the molding material M reaches the parting surfaces 830 of the stationary mold 810 and the movable mold 820. During this period, as shown in FIG. 7, the stationary mold 810 and the movable mold 820 are closed. In the present embodiment, the actual value of the mold clamping force F is stable at the set value, but the actual value of the mold clamping force F may be stable at a value shifted from the set value.

For example, the stability of the actual value of the mold clamping force F at a value shifted from the set value is due to an error that occurs when the set value of the mold clamping force F is converted to the set value of the crosshead position, or an error that occurs due to a dimensional change of the mold unit 800 according to a temperature change. In any case, after the start of the injection process, until the time t0, the stationary mold 810 and the movable mold 820 are closed, and the actual value of the mold clamping force F is stable.

When the molding material M reaches the parting surfaces 830 of the stationary mold 810 and the movable mold 820 at the time t0 and the filling pressure P1 is higher than the mold clamping pressure P2, the stationary mold 810 and the movable mold 820 are opened by the filling pressure P1. As a result, as shown in FIG. 8, a gap is formed between the stationary mold 810 and the movable mold 820. The effective length La of the tie bar 140 is increased by the size S of the gap, and the actual value of the mold clamping force F is increased.

Therefore, the range of increase ΔF in the actual value of the mold clamping force F represents the size S of the gap formed between the stationary mold 810 and the movable mold 820. As the size S of the gap increases, the range of increase ΔF increases. For example, the size S of the gap can be easily calculated by using Expression (1):

$$S = k \times \Delta F \times La / (A \times E) \tag{1}$$

In Expression (1), k represents a constant of proportionality, A represents a total cross-sectional area of the plurality of tie bars 140, and E represents an average Young's modulus of the plurality of tie bars 140. k is a correction coefficient. k is corrected according to deformation of the mold unit 800 or the platen. In a case where no correction is required, k is 1. In addition, La is the effective length of the tie bar 140, and is, for example, the effective length at the start of the injection process.

The mold clamping control unit 711 controls the range of increase ΔF in the actual value of the mold clamping force F to be more than zero and equal to or less than the upper limit. Accordingly, a gap sufficient to discharge the gas from between the stationary mold 810 and the movable mold 820 and to prevent the leakage of the molding material M can be formed, and molding defects can be suppressed.

A lower limit of the range of increase ΔF is set to be more than zero. Accordingly, the gap is formed between the stationary mold 810 and the movable mold 820, and the gas can be discharged through the gap. It is desirable to set an appropriate size S of the gap in consideration of a measurement error and a processing error. When the size S of the gap close to such errors is set, there is a concern that the size of the gap may become locally zero, and an effect of releasing the gas may not be obtained. In view of these circumstances, the lower limit of the range of increase ΔF is preferably set such that the size S of the gap is 1 μm or more.

On the other hand, the upper limit of the range of increase ΔF is appropriately set according to a viscosity of the molding material M so that the molding material M does not leak. For example, the upper limit is set so that the size S of the gap is set to be 20 μm or less. As the viscosity of the molding material M becomes lower, the molding material M is more likely to leak. Therefore, the upper limit of the range of increase ΔF is set to be smaller. The size S of the gap is preferably 8 μm or smaller.

As shown in FIG. 6, the actual value of the mold clamping force F may increase and thereafter decrease, or may return to the same value as at the start of the injection process when the injection process is completed. The fact that the actual value of the mold clamping force F returns to the same value as at the start of the injection process suggests that the gap between the stationary mold 810 and the movable mold 820 is eliminated, and that no burrs occur. Therefore, the mold clamping control unit 711 may determine that no burrs occur in a case where the actual value of the mold clamping force F increases and thereafter decreases and the range of increase ΔF becomes equal to or less than a threshold.

The mold clamping control unit 711 monitors the range of increase ΔF in the actual value of the mold clamping force F, and in a case where the range of increase ΔF exceeds the upper limit or the range of increase ΔF is less than the lower limit, changes the effective length La of the tie bar 140 so that the range of increase ΔF becomes equal to or more than the lower limit and equal to or less than the upper limit. Accordingly, the range of increase ΔF can be automatically controlled.

Specifically, for example, the mold clamping control unit 711 controls the mold space adjustment mechanism 180 during the mold opening to rotate the adjustment nut 182, thereby changing the effective length La of the tie bar 140. The reason why the adjustment nut 182 is rotated during the mold opening is to reduce friction between the tie bar 140 and the adjustment nut 182. The adjustment nut 182 may be rotated during the mold clamping. However, in that case, the tie bar 140 and the adjustment nut 182 are in close contact with each other due to the mold clamping force, resulting in an increase in friction.

As described above, the mold clamping control unit 711 changes the effective length La of the tie bar 140 by controlling the mold space adjustment mechanism 180 during the mold opening and rotating the adjustment nut 182. As the effective length La during the mold opening decreases, an interval between the stationary platen 110 and the movable platen 120 when the pressurizing is completed decreases, and the actual value of the mold clamping force F when the pressurizing is completed increases. As a result, the stationary platen 110 and the movable platen 120 are difficult to open. Therefore, the range of increase ΔF in the actual value of the mold clamping force F during the injection process decreases.

Instead of changing the effective length La of the tie bar 140, the mold clamping control unit 711 may change the mold clamping position of the crosshead 151 (see FIG. 2) with respect to the toggle support 130. As the mold clamping position of the crosshead 151 advances, the actual value of the mold clamping force F when the pressurizing is completed increases. As a result, the stationary platen 110 and the movable platen 120 are difficult to open. Therefore, the range of increase ΔF in the actual value of the mold clamping force F during the injection process decreases.

In a case where the effective length La of the tie bar 140 is changed, a link angle θ (see FIG. 2) during the mold clamping is maintained at a desired value, unlike in the case where the mold clamping position of the crosshead 151 with respect to the toggle support 130 is changed. Therefore, a toggle magnification during the mold clamping can be maintained at a desired value.

The mold clamping control unit 711 monitors the range of increase ΔF in the actual value of the mold clamping force F, and may perform control to notify of an alarm in a case where the range of increase ΔF is 0 or exceeds the upper limit. The mold clamping control unit 711 performs control to notify of an alarm by controlling an image display device, a warning light, a buzzer, or the like.

Figure 9:
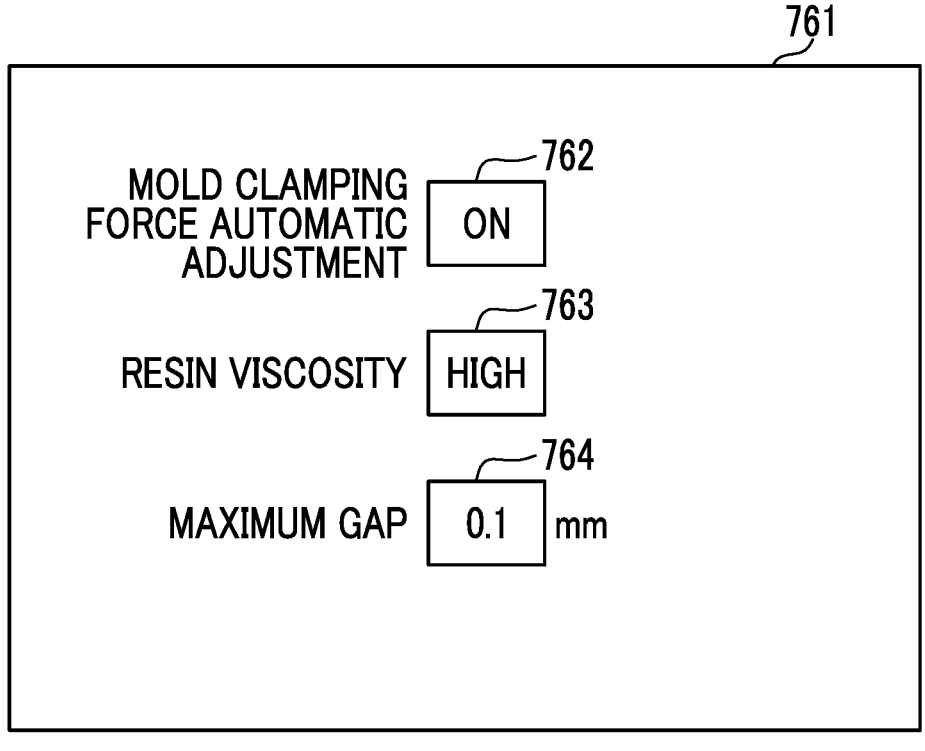
FIG. 9 is a view showing an example of a screen.

Next, an example of a screen will be described with reference to FIG. 9. A screen 761 shown in FIG. 9 is displayed on the display device 760 under the control of a display control unit 715 shown in FIG. 3. The screen 761 is, for example, the screen of the touch panel 770 (see FIGS. 1 and 2).

For example, the screen 761 includes a first input unit 762, a second input unit 763, and a display unit 764. The first input unit 762, the second input unit 763, and the display unit 764 may be included in the same screen 761 and be simultaneously displayed on the display device 760 as shown in FIG. 9, or may be included in different screens (not shown) and be displayed on the display device 760 by switching the screen.

The first input unit 762 receives an input for selecting whether or not to perform the control of the range of increase ΔF. For example, a worker selects whether or not to perform the control of the range of increase ΔF by pressing the first input unit 762. It is possible to allow the worker to select whether or not to perform the control of the range of increase ΔF according to a skill level of the worker, and thus the convenience of the worker can be improved.

The first input unit 762 may switch the display according to the input operation of the worker. That is, the display may be switched according to the selection of whether or not to perform the control of the range of increase ΔF. For example, in a case where the display of the first input unit 762 is "ON", the mold clamping control unit 711 performs the control of the range of increase ΔF. On the other hand, in a case where the display of the first input unit 762 is "OFF", the mold clamping control unit 711 does not perform the control of the range of increase ΔF.

The second input unit 763 receives an input for changing the upper limit of the range of increase ΔF. For example, the worker changes the upper limit of the range of increase ΔF in stages by pressing the second input unit 763. The upper limit of the range of increase ΔF is appropriately set according to the viscosity of the molding material M. As the viscosity of the molding material M becomes lower, the molding material M is more likely to leak. Therefore, the upper limit of the range of increase ΔF is set to be smaller.

A level of the viscosity of the molding material M may be input to the second input unit 763 so that even a less skilled worker who does not know the relationship between the viscosity of the molding material M and the range of increase ΔF can appropriately change the upper limit of the range of increase ΔF. For example, the viscosity of the molding material M is input in three stages of "high", "medium", and "low". The viscosity of the molding material M may be input in two stages or four or more stages.

The second input unit 763 may switch the display according to the input operation of the worker, that is, the display may be switched according to the upper limit of the range of increase ΔF. The second input unit 763 may display the viscosity of the molding material M in stages. As the viscosity of the molding material M becomes lower, the molding material M is more likely to leak. Therefore, the upper limit of the range of increase ΔF is set to be smaller.

The display unit 764 numerically displays the size S of the gap estimated by a gap estimation unit 716 (see FIG. 3), which will be described later. The display unit 764 numerically displays the size S of the gap, which can call the attention of the worker. For example, the gap estimation unit 716 calculates the size S of the gap using Expression (1).

Hitherto, the embodiments of the control device of an injection molding machine, the injection molding machine, and the method of controlling an injection molding machine according to the present invention have been described. However, the present invention is not limited to the above-described embodiments. Various modifications, corrections, substitutions, additions, deletions, and combinations can be made within the scope of the appended claims. As a matter of course, all of these also belong to the technical scope of the present invention.

It should be understood that the invention is not limited to the above-described embodiment, but may be modified into various forms on the basis of the spirit of the invention. Additionally, the modifications are included in the scope of the invention.

What is claimed is:

1. A control device of an injection molding machine comprising:

a mold clamping control unit that, with respect to an actual value of a mold clamping force for pressing a stationary mold and a movable mold after pressurizing of the mold clamping force is completed and before a molding material reaches parting surfaces of the stationary mold and the movable mold:

in a single molding cycle, controls a range of increase in the actual value of the mold clamping force after the molding material reaches the parting surfaces to satisfy a predetermined condition, or determines whether burrs occur depending on the molding material.

2. The control device of an injection molding machine according to claim 1, wherein the mold clamping control unit controls the range of increase to be more than 0 and equal to or less than an upper limit.

3. The control device of an injection molding machine according to claim 2, wherein the mold clamping control unit controls the range of increase to be more than 0 and equal to or less than the upper limit until a filling process is completed.

4. The control device of an injection molding machine according to claim 2, wherein the mold clamping control unit controls the range of increase to be more than 0 and equal to or less than the upper limit until a holding pressure process is completed.

5. The control device of an injection molding machine according to claim 1, wherein the mold clamping control unit controls the range of increase to be equal to or less than an upper limit by controlling an effective length of a tie bar that extends in accordance with the mold clamping force, and the effective length of the tie bar is a length of a portion of the tie bar that extends in accordance with the mold clamping force.

6. The control device of an injection molding machine according to claim 1, further comprising:

a display control unit that displays a screen including a first input unit that receives an input for selecting whether or not to perform control of the range of increase.

7. The control device of an injection molding machine according to claim 1, further comprising:

a display control unit that displays a screen including a second input unit that receives an input for changing an upper limit of the range of increase.

8. The control device of an injection molding machine according to claim 1, further comprising:

a gap estimation unit that estimates a size of a gap formed between the stationary mold and the movable mold after the molding material reaches the parting surfaces, based on the range of increase; and a display control unit that displays a screen including a display unit that numerically displays the size of the gap estimated by the gap estimation unit.

9. The control device of an injection molding machine according to claim 1, wherein the mold clamping control unit performs control to notify of an alarm in a case where the range of increase is 0 or exceeds an upper limit.

10. A control device of an injection molding machine comprising:

a mold clamping control unit that, with respect to an actual value of a mold clamping force for pressing a stationary mold and a movable mold after pressurizing of the mold clamping force is completed and before a molding material reaches parting surfaces of the stationary mold and the movable mold:

in a single molding cycle, controls a range of increase in the actual value of the mold clamping force after the molding material reaches the parting surfaces to satisfy a predetermined condition, or determines whether burrs occur depending on the molding material, wherein the mold clamping control unit determines that no burrs occur in a case where the actual value of the mold clamping force increases and thereafter decreases and the range of increase becomes equal to or less than a threshold as the molding material reaches the parting surfaces.

11. An injection molding machine comprising:

the control device according to claim 1;

a mold clamping unit that performs mold clamping of a mold unit including the stationary mold and the movable mold; and an injection unit that fills an inside of the mold unit with a molding material.

12. A method of controlling an injection molding machine comprising:

with respect to an actual value of a mold clamping force for pressing a stationary mold and a movable mold after pressurizing of the mold clamping force is completed and before a molding material reaches parting surfaces of the stationary mold and the movable mold:

in a single molding cycle, controlling a range of increase in the actual value of the mold clamping force after the molding material reaches the parting surfaces to satisfy a predetermined condition, or determining whether burrs occur depending on the molding material.

* * * * *